(12) United States Patent
Lauder et al.

(10) Patent No.: US 11,186,363 B2
(45) Date of Patent: Nov. 30, 2021

(54) ELECTRIC PROPULSION SYSTEM FOR A ROTARY WING AIRCRAFT

(71) Applicant: Sikorsky Aircraft Corporation, Stratford, CT (US)

(72) Inventors: Timothy Fred Lauder, Oxford, CT (US); Jonathan Hartman, Lorton, VA (US); Peter James Waltner, Royal Palm Beach, FL (US)

(73) Assignee: Sikorsky Aircraft Corporation, Stratford, CT (US)

( * ) Notice: Subject to any disclaimer, the term of this patent is extended or adjusted under 35 U.S.C. 154(b) by 922 days.

(21) Appl. No.: 15/295,258

(22) Filed: Oct. 17, 2016

(65) Prior Publication Data

US 2017/0297689 A1   Oct. 19, 2017

Related U.S. Application Data

(60) Provisional application No. 62/244,361, filed on Oct. 21, 2015.

(51) Int. Cl.
   *B64C 27/14*   (2006.01)
   *B64D 27/24*   (2006.01)
   *B64C 27/33*   (2006.01)
   *H02K 7/08*    (2006.01)

(52) U.S. Cl.
   CPC ............. *B64C 27/14* (2013.01); *B64C 27/33* (2013.01); *B64D 27/24* (2013.01); *H02K 7/08* (2013.01); *Y02T 50/40* (2013.01); *Y02T 50/60* (2013.01)

(58) Field of Classification Search
   CPC .......... B64C 27/14; B64C 27/41; B64C 27/43
   See application file for complete search history.

(56) References Cited

U.S. PATENT DOCUMENTS

| 1,936,542 A | 11/1933 | Nardone |
| 3,362,255 A | 1/1968 | De Rocca et al. |
| 4,558,770 A | 12/1985 | Woodruff |
| 4,690,390 A | 9/1987 | Kish |
| 4,729,753 A | 3/1988 | Neathery et al. |
| 4,899,957 A | 2/1990 | Eickmann |
| 4,938,333 A | 7/1990 | Kish |
| 5,188,511 A | 2/1993 | Ebert |
| 5,271,295 A | 12/1993 | Marnot |

(Continued)

FOREIGN PATENT DOCUMENTS

| CN | 1857965 A | 11/2006 |
| CN | 101244762 A | 8/2008 |

(Continued)

OTHER PUBLICATIONS

Notice of Allowance; U.S. Appl. No. 15/655,665, Date Filed: Jul. 20, 2017; Tilting Coaxial Rotor for a Rotary Wing Aircraft; dated Dec. 11, 2019, pp. 1-26.

*Primary Examiner* — Richard R. Green
(74) *Attorney, Agent, or Firm* — Baker Botts L.L.P.

(57) ABSTRACT

A rotary wing aircraft includes an airframe, a stationary mast fixedly engaged to the airframe and extending along a first axis, and an electric motor. The electric motor includes a stator assembly engaged to the mast and a rotor assembly disposed radially outward from the stator assembly and configured to rotate with respect to the stator assembly. A plurality of rotor blades project radially outward from the rotor assembly.

19 Claims, 7 Drawing Sheets

(56) References Cited

U.S. PATENT DOCUMENTS

| | | | |
|---|---|---|---|
| 5,749,449 A | 5/1998 | Kearney et al. | |
| 6,484,967 B2 | 11/2002 | Protte | |
| 6,575,401 B1 * | 6/2003 | Carver | B64C 27/20 244/12.2 |
| 6,823,972 B2 | 11/2004 | Gmirya | |
| 7,083,142 B2 | 8/2006 | Scott | |
| 7,229,251 B2 | 6/2007 | Bertolotti et al. | |
| 7,410,123 B2 * | 8/2008 | Nunnally | B64C 27/20 244/23 C |
| 7,621,480 B2 | 11/2009 | Darrow, Jr. et al. | |
| 8,181,902 B2 | 5/2012 | Schlunke | |
| 8,235,324 B1 | 8/2012 | Birch et al. | |
| 8,531,072 B2 | 9/2013 | Wishart | |
| 8,628,042 B2 | 1/2014 | Imbert et al. | |
| 8,844,880 B1 | 9/2014 | McGregor | |
| 8,851,415 B1 | 10/2014 | Lugg | |
| 8,931,732 B2 | 1/2015 | SIROHi et al. | |
| 8,948,928 B2 | 2/2015 | Alber et al. | |
| 9,004,395 B2 | 4/2015 | Botti | |
| 9,038,940 B1 * | 5/2015 | van der Westhuizen | B64C 27/18 244/17.25 |
| 9,148,074 B2 * | 9/2015 | Boughtwood | H02N 1/004 |
| 9,272,779 B2 | 3/2016 | Groenewald et al. | |
| 9,446,842 B2 | 9/2016 | Luyks | |
| 9,584,000 B2 | 2/2017 | Ruan et al. | |
| 9,725,179 B2 | 8/2017 | Aubert et al. | |
| 9,828,089 B2 | 11/2017 | Lauder et al. | |
| 10,053,207 B2 | 8/2018 | Cox | |
| 10,116,187 B1 * | 10/2018 | Wishart | B64D 27/24 |
| 2009/0140095 A1 | 6/2009 | Sirohi et al. | |
| 2010/0209242 A1 | 8/2010 | Popelka et al. | |
| 2011/0015034 A1 | 1/2011 | Ehinger et al. | |
| 2012/0074820 A1 * | 3/2012 | Takeuchi | H02K 7/116 310/75 R |
| 2013/0126669 A1 | 5/2013 | Hamann et al. | |
| 2013/0170985 A1 | 7/2013 | Altmikus et al. | |
| 2014/0302938 A1 | 10/2014 | Lidak | |
| 2014/0316608 A1 | 10/2014 | Alber et al. | |
| 2015/0093272 A1 | 4/2015 | Komer et al. | |
| 2017/0040870 A1 * | 2/2017 | Ballauf | B64C 27/14 |
| 2017/0167317 A1 | 6/2017 | Lee et al. | |
| 2017/0217576 A1 | 8/2017 | Lauder et al. | |
| 2017/0253328 A1 | 9/2017 | Wang | |
| 2018/0002005 A1 * | 1/2018 | Groenewald | B64C 27/41 |
| 2018/0105263 A1 | 4/2018 | Lauder | |
| 2018/0229835 A1 | 8/2018 | Lauder | |
| 2019/0023383 A1 | 1/2019 | Lauder | |
| 2019/0023384 A1 | 1/2019 | Lauder | |
| 2019/0210717 A1 | 7/2019 | Lauder | |

FOREIGN PATENT DOCUMENTS

| | | | |
|---|---|---|---|
| GB | 2360752 A | | 10/2001 |
| JP | 2011006041 A | * | 1/2011 |
| JP | 1742390 B2 | | 8/2011 |
| JP | 2014149075 A | | 8/2014 |
| WO | 2005100154 A1 | | 10/2005 |
| WO | 2016128330 A1 | | 8/2016 |

* cited by examiner

ELECTRIC PROPULSION SYSTEM FOR A ROTARY WING AIRCRAFT

CROSS-REFERENCE TO RELATED APPLICATION

This application claims the benefit of U.S. provisional patent application Ser. No. 62/244,361 filed Oct. 21, 2015, the entire contents of which are incorporated herein by reference.

BACKGROUND

The present disclosure relates to a rotary wing aircraft, and more particularly, to a rotary wing aircraft having an electric propulsion system.

Traditional drive systems for rotary wing aircraft transmit loads to the airframe. A main rotor shaft is designed to transmit the power (i.e., torque and RPM) necessary to rotate a plurality of rotor blades as well as react to flight load conditions. Traditional gearboxes supply torque and RPM to the rotor blades and reacts or transmits rotor blade loads to the airframe. The motor transmits torque and inertial loads to the airframe through a mounting structure. Such torque and load transmissions require strong structures that contribute toward unwanted weight of the aircraft.

SUMMARY

A rotary wing aircraft according to one, non-limiting, embodiment of the present disclosure includes an airframe; a mast fixedly engaged to the airframe and extending along a first axis; an electric motor including a stator assembly engaged to the mast and a rotor assembly disposed radially outward from the stator assembly and configured to rotate with respect to the stator assembly; and a plurality of rotor blades projecting radially outward from the rotor assembly.

Additionally to the foregoing embodiment, the aircraft includes a teetering mechanism pivotally engaged to the rotor assembly, and wherein each one of the plurality of rotor blades are engaged to and project radially outward from the teetering mechanism.

In the alternative or additionally thereto, in the foregoing embodiment, the electric motor is supported by a distal end portion of the mast.

In the alternative or additionally thereto, in the foregoing embodiment, the electric motor includes a bearing assembly including a first race engaged to the rotor assembly, a second race engaged to the stator assembly and a plurality of bearings disposed between the first and second races.

In the alternative or additionally thereto, in the foregoing embodiment, the rotor assembly includes a rotor housing and a bearing race located radially between the rotor housing and the mast.

In the alternative or additionally thereto, in the foregoing embodiment, the teetering mechanism includes a rocker arm pivotally engaged to the rotor housing and along a pivot axis that traverses the first axis.

In the alternative or additionally thereto, in the foregoing embodiment, the plurality of rotor blades project radially outward from and are supported by the rocker arm.

In the alternative or additionally thereto, in the foregoing embodiment, the rocker arm extends circumferentially continuously and is disposed radially outward from the rotor housing with respect to the first axis.

In the alternative or additionally thereto, in the foregoing embodiment, the rocker arm is oblong and extends longitudinally normal to the pivot axis.

In the alternative or additionally thereto, in the foregoing embodiment, the rotor assembly includes a plurality of magnets arranged circumferentially about the mast and supported by the rotor housing.

In the alternative or additionally thereto, in the foregoing embodiment, the stator assembly includes a stator housing engaged to the mast, and a plurality of coils supported by the stator housing and arranged circumferentially about the mast.

In the alternative or additionally thereto, in the foregoing embodiment, the aircraft includes an articulating mechanism having a plurality of flex beams engaged to and projecting radially outward from the rotor assembly, and wherein each one of the plurality of rotor blades are engaged to and project radially outward from a respective one of the plurality of flex beams.

In the alternative or additionally thereto, in the foregoing embodiment, the aircraft includes a heat exchanger configured to cool the stator assembly.

An electric propulsion system for an aircraft according to another, non-limiting, embodiment includes a stator assembly configured about a rotational axis and including a plurality of electric coils; a rotor assembly configured to rotate with respect to the stator assembly and including a plurality of magnets configured to react with an induced magnetic field generated by the electric coils when energized for rotation of the stator assembly; a teetering mechanism pivotally engaged to the rotor assembly about a pivot axis; and a plurality of blades circumferentially spaced from one-another with respect to the rotational axis, and engaged to and projecting radially outward from the teetering mechanism.

Additionally to the foregoing embodiment, the pivot axis is normal to and intersects the rotational axis.

In the alternative or additionally thereto, in the foregoing embodiment, the teetering mechanism includes a rocker arm pivotally engaged to the stator assembly about the pivot axis.

In the alternative or additionally thereto, in the foregoing embodiment, the pivot axis traverses the rotational axis.

In the alternative or additionally thereto, in the foregoing embodiment, the rocker arm extends circumferentially continuously and is disposed radially outward from the rotor assembly.

In the alternative or additionally thereto, in the foregoing embodiment, the rocker arm is oblong and extends longitudinally along a feather axis disposed normal to the pivot axis.

In the alternative or additionally thereto, in the foregoing embodiment, diametrically opposed clearances are each defined by and located between the rocker arm and the rotor assembly.

The foregoing features and elements may be combined in various combinations without exclusivity, unless expressly indicated otherwise. These features and elements as well as the operation thereof will become more apparent in light of the following description and the accompanying drawings. However, it should be understood that the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
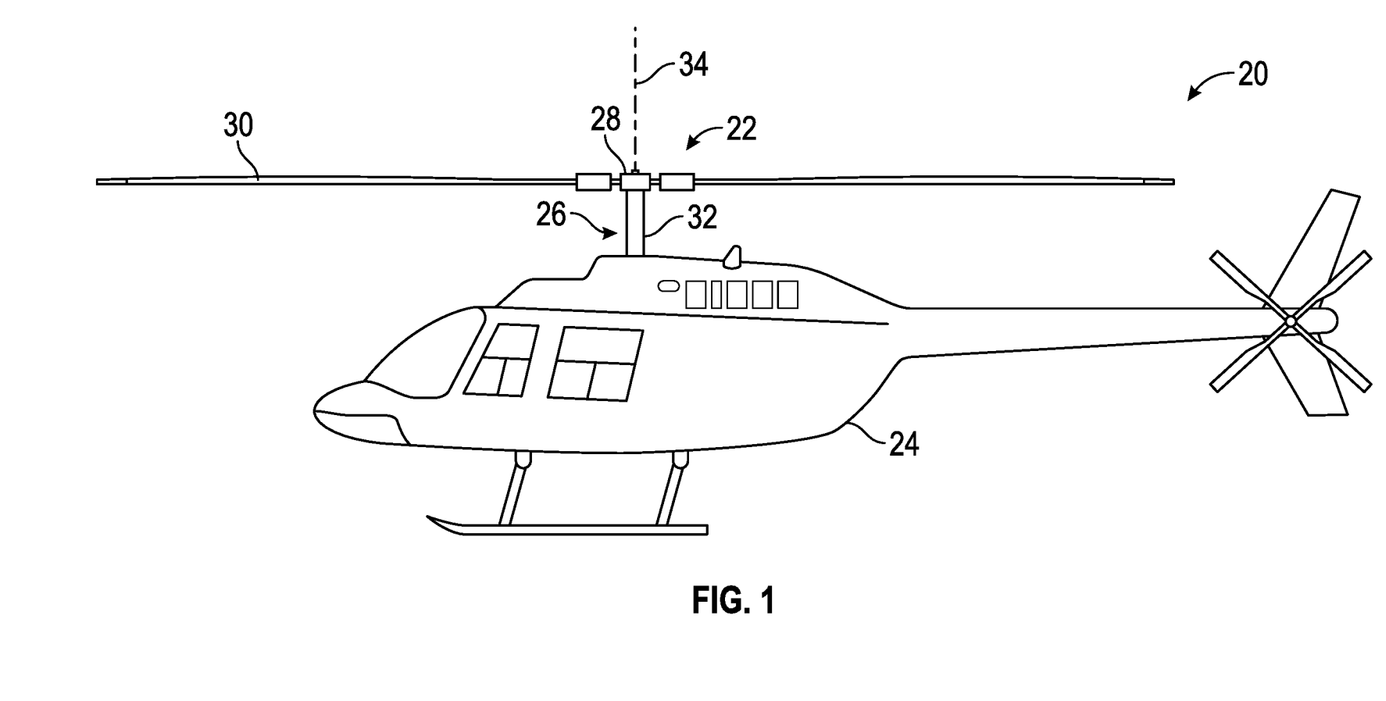
FIG. 1 is a side view of a rotary wing aircraft incorporating the electric propulsion system as one, non-limiting, exemplary embodiment of the present disclosure.

Referring to FIG. 1, an aircraft 20 that may be a rotary wing aircraft or helicopter is illustrated with an electric propulsion system 22 that may generally be the integration of a direct drive electric motor into a rotary wing aircraft. The aircraft 20 includes an airframe or cabin 24 that is generally stationary with respect to certain moving components of the propulsion system 22. The propulsion system 22 may include a mast 26, an electric motor 28 and a plurality of rotor blades 30. The mast 26 may be stationary with respect to the cabin 24 and may project outward from the cabin 24. The electric motor 28 may be integrated into a distal end portion 32 of the stationary mast 26 that may be located and spaced above the cabin 24. The plurality of rotor blades 30 are spaced circumferentially from one-another with respect to an axis or centerline 34 of the mast 26 and generally project radially outward from the electric motor 28.

Figure 2:
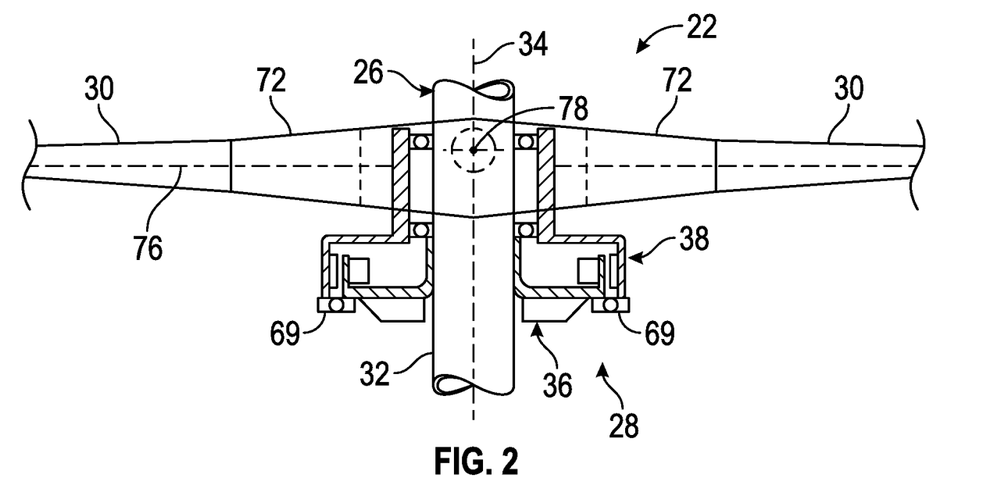
FIG. 2 is a cross section of the electric propulsion system.
Figure 3:
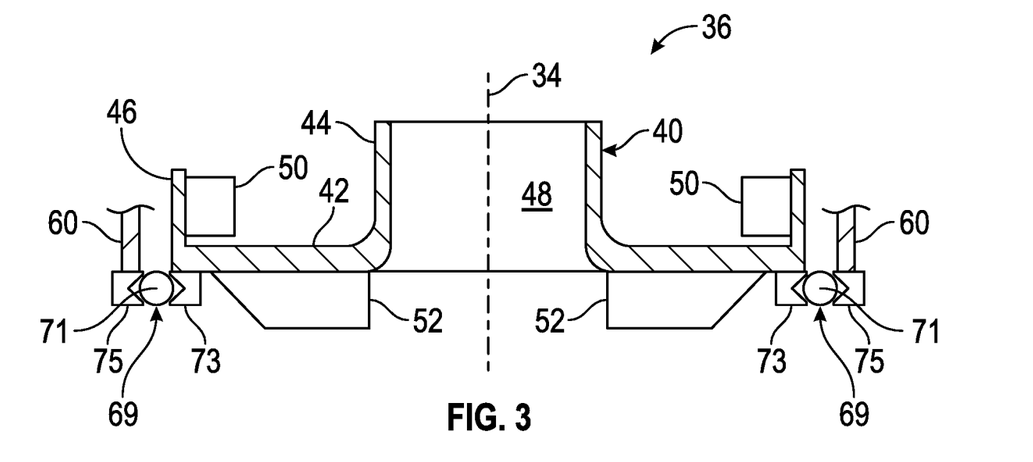
FIG. 3 is a cross section of a stator housing of the electric propulsion system.

Referring to FIGS. 2 and 3, the electric motor 28 of the propulsion system 22 may include a stator assembly 36 that may be rigidly engaged to the distal end portion 32 of the mast 26, and a rotor assembly 38 that may be, at least in-part, spaced radially outward from the stator assembly 28 and is configured to rotate about the axis 34. The plurality of rotor blades 30 may project radially outward from the rotor assembly.

The stator assembly 36 includes a housing 40 disposed substantially concentric to the axis 34. The housing 40 may include an annular portion 42 spanning radially between a substantially cylindrical inward portion 44 and a substantially outward portion 46. The inward portion 44 of housing 40 may be rigidly engaged to the mast 26, and may define the boundaries of a bore 48 through which the mast 26 projects. The outward portion 46 may project axially in an upward direction from the annular portion 42 and may carry and support a plurality of electric coils 50 of the stator assembly 36 configured to generate a magnetic field when energized. A heat exchanger 52 may be supported by an underside of the annular portion 42 for cooling of the electric coils 50 when energized. The plurality of coils 50 and the heat exchanger 52 may each be generally ring-shaped and centered about the axis 34. It is further contemplated and understood that the heat exchanger(s) may be mounted to the top side depending upon the orientation of the integrated motor 28 (i.e. coils and permanent magnets).

Figure 4:
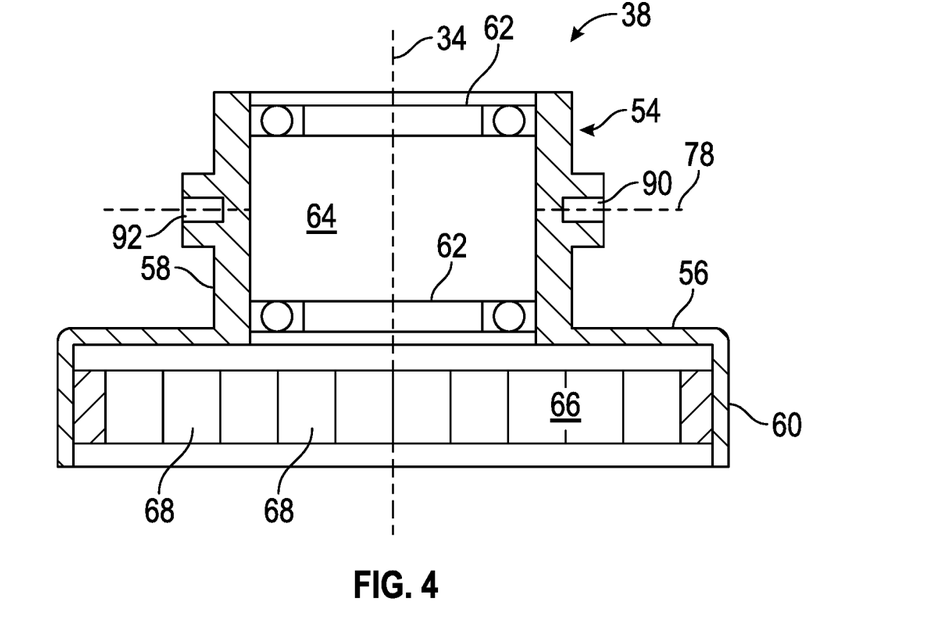
FIG. 4 is a cross section of a rotor housing of the electric propulsion system.

Referring to FIGS. 2 and 4, the rotor assembly 38 is configured to rotate about the axis 34 and with respect to the stationary stator assembly 36, mast 26, and cabin 24. The rotor assembly 38 includes a rotor housing 54 concentrically located about the axis 34. The rotor housing 54 may include an annular portion 56 spanning radially between a substantially cylindrical inward portion 58 and a substantially outward portion 60 of the rotor housing 54. At least one bearing or bearing race 62 (i.e., two illustrated) may be located radially between and supported by the inward portion 58 of the rotor housing 54 and the distal end portion 32 of the mast 26. The bearings 62 may be constructed and arranged to rotationally connect the inward portion 58 of the rotor housing 54 to the mast 26.

The inward portion 58 of housing 54 may extend axially upward from the annular portion 56 and defines the boundaries of a bore 64 through which the mast 26 projects. The outward portion 60 may project axially downward from the annular portion 56 and may define the boundaries of a counter bore 66. A radially inward side of the outward portion 60 may be engaged to and supports a plurality of permanent magnets 68 orientated in a ring-shape and having a magnetic field configured to react with the induced magnetic field of the plurality of coils 50 of the stator assembly 36 causing the rotor assembly 38 to rotate about the stationary mast 26.

When the electric motor 28 is assembled, the outward portion 46 of the stator housing 40 is axially aligned to and spaced radially inward from the outward portion 60 of the rotor housing 54. That is, the outward portion 46 of the stator housing 40 and the plurality of coils 50 may be generally located in the counter bore 66.

Referring to FIGS. 2-4, the electric motor 28 may further include a bearing assembly 69 that may be a thrust bearing assembly. The bearing assembly 69 is adapted to maintain alignment of the electric coils 50 to the permanent magnets 68. The bearing assembly 69 may include a plurality of bearings 71 seated and positioned between opposite races 73, 75. The first race 73 may be positioned radially inward and fixed to the stator housing 40, and the second race 75 may be positioned radially outward from the first race 73 and fixed to the outward portion 60 of the rotor housing 54.

The bearing assembly 69 may enable controlled flexing of the housings 40, 54 thereby enabling use of thinner and lighter weight housing material. That is, various portions of the housings 40, 54 may flex, but the spacing between the coils 50 and permanent magnets 68 are maintained at a close tolerance by the bearing assembly 69. In this way, motor efficiency is optimized and any potential for chafing between the housings 40, 54 is eliminated.

Referring to FIGS. 2 and 4-6, the propulsion system 22 may further include a teetering mechanism 70 generally located between the plurality of rotor blades 30 and the inward portion 64 of the rotor housing 54. The teetering mechanism 70 functions to teeter the plurality of rotor blades 30. The term "teeter" is generally known in the art of aircrafts such as helicopters. The teetering mechanism 70 may include a rocker arm 72 (i.e., yoke), and a pivoting joint 74 carried between the inward portion 58 of the rotor housing 54 and the rocker arm 72. The rocker arm 72 may generally be oblong, longitudinally extending along a feather axis 76, and having opposite ends that may be rigidly and directly engaged to respective rotor blades of the plurality of rotor blades 30.

Figure 5:
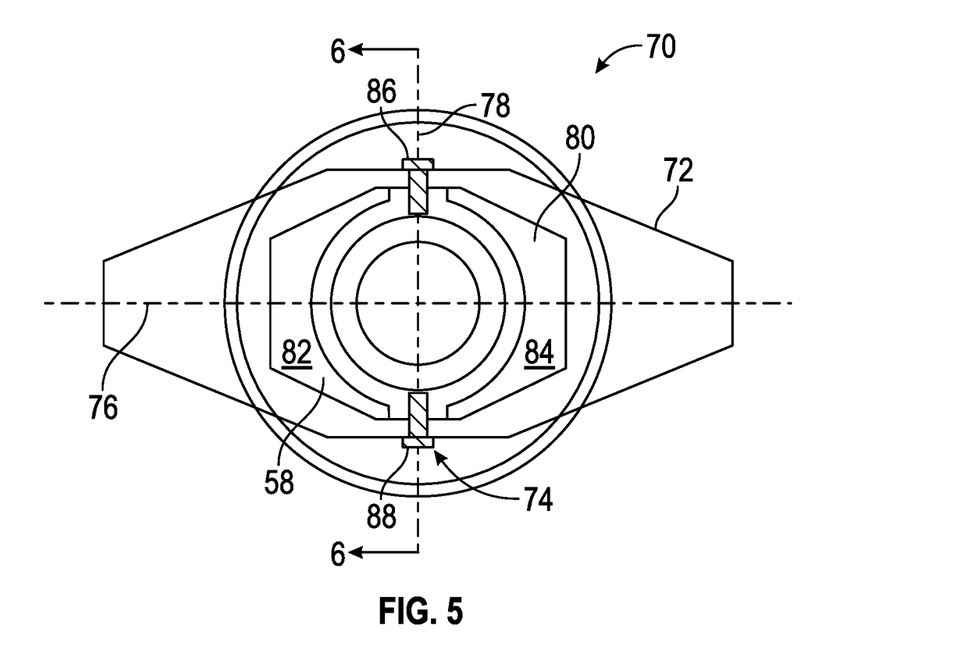
FIG. 5 is a top view of a teetering mechanism of the electric propulsion system.
Figure 6:
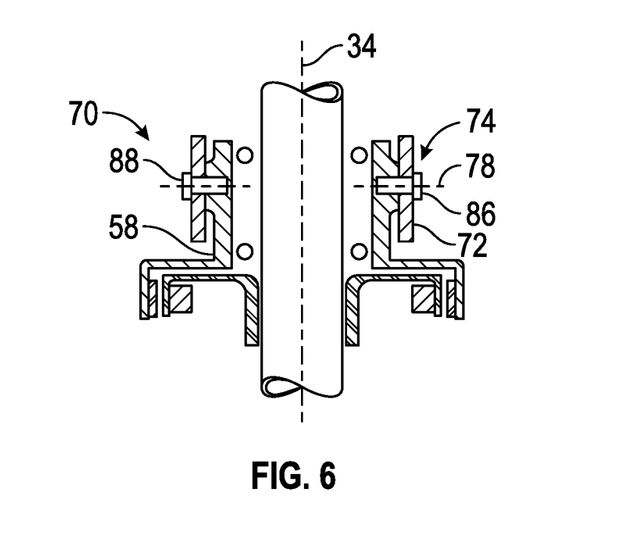
FIG. 6 is a cross section of the teetering mechanism taken along line 6-6 of FIG. 5.

The pivoting joint 74 is configured to pivot the rocker arm 72 about a pivot axis 78 that may intersect both the rotational axis 34 and the feather axis 76 and may be substantially normal thereto. The rocker arm 72 may extend circumferentially and continuously about the inward portion 58 of the rotor housing 54. When assembled, the inward portion 58 of the rotor housing 54 may extend through a hole 80 having boundaries defined by the rocker arm 72. The hole 80 may include two diametrically opposed clearances 82, 84 having boundaries defined between the inward portion 58 and the rocker arm 72. The clearances 82, 84 are sized to provide the spacing needed to enable the rocker arm 72 to pivot without striking the inward portion 58.

The pivoting joint 74 may include two pins 86, 88 extending along the pivot axis 76. Each pin 86, 88 may be removable and may have an enlarged head with a shank projecting through the rocker arm 72 along the pivot axis 78 and into respective bores 90, 92 (see FIG. 4) that may be blind and having boundaries defined by the inward segment 58 of the rotor housing 54. It is further contemplated and understood that the pivot joint 74 may be any configuration. For example, the pins may be one piece and unitary with the rocker arm (i.e. projecting radially inward), or may be one piece and unitary with the inward portion of the rotor housing (i.e. projecting radially outward).

Figure 7:
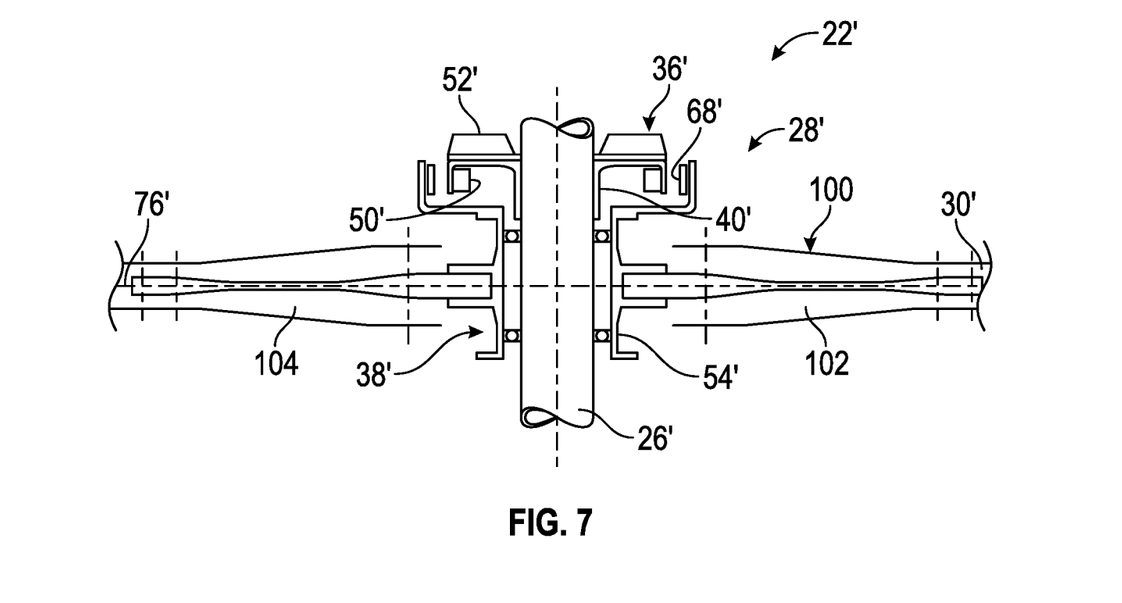
FIG. 7 is a cross section of a second embodiment of the electric propulsion system illustrating an articulating mechanism.

Referring to FIG. 7, a second embodiment of an electric propulsion system is illustrated wherein like elements to the first embodiment have like identifying numerals except with the addition of a prime symbol as a suffix. The electric propulsion system 22' may include a stationary mast 26', an electric motor 28' and a plurality of rotor blades 30'. The electric motor 28' may include a stator assembly 36' and a rotor assembly 38' substantially located beneath the stator assembly 36'.

The stator assembly 36' includes a housing 40' supporting a plurality of electric coils 50' and a heat exchanger 52' generally mounted to a top side of the housing (i.e., above the housing 40'). The rotor assembly 38' includes a rotor housing 54' that supports a plurality of permanent magnets 68' generally located, as one example, above the plurality of rotor blades 30'.

The propulsion system 22' may further include an articulating mechanism 100 generally located between the plurality of rotor blades 30' and the rotor housing 54'. The articulating mechanism 100 functions to articulate the plurality of rotor blades 30'. The term "articulate" is generally known in the art of aircrafts such as helicopters. The articulating mechanism 100 may include flex beams 102, 104 that are engaged to and project outward from (i.e., in opposite directions) the rotor housing 54' and along a feather axis 76'. The radially inward ends (i.e. with respect to axis 34') may be engaged to the rotor housing 54' and opposite ends may be directly engaged to respective rotor blades of the plurality of rotor blades 30'. It is further contemplated and understood that another, non-limiting, example of articulation may include offset hinges that may also include elastomeric bearings.

Figure 8:
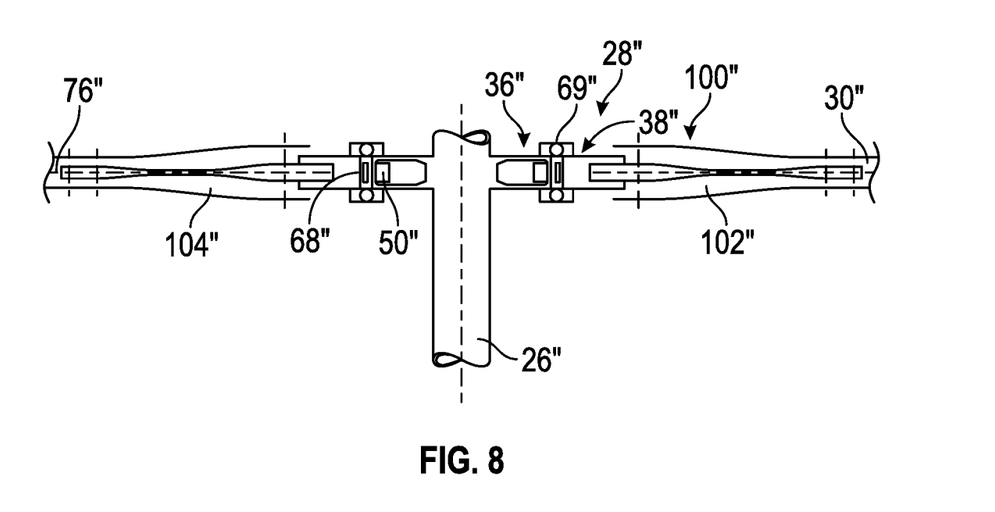
FIG. 8 is a cross section of a third embodiment of an electric propulsion system.
Figure 9:
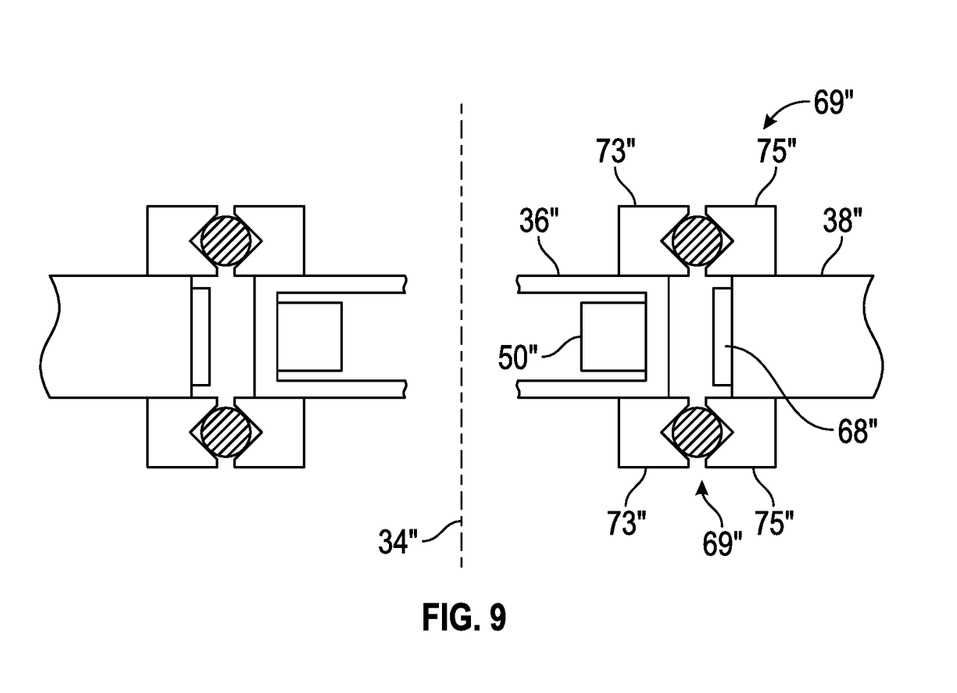
FIG. 9 is a partial enlarged cross section of the electric propulsion system of FIG. 8.

Referring to FIGS. 8 and 9, an additional embodiment of an electric propulsion system is illustrated wherein like elements to the previous embodiments have like identifying numerals, except with the addition of a double prime symbol as a suffix. In this embodiment, the electric propulsion system 22" may include a stationary mast 26", an electric motor 28". The electric motor 28" may include a stator assembly 36", a rotor assembly 38", and a rotor-stator alignment bearing assembly 69".

Similar to the embodiment described in FIG. 2, the alignment bearing assembly 69" is disposed between the rotor assembly 38" and the stator assembly 36" and serves to maintain the relative position and spacing between the plurality of permanent magnets 68" disposed on rotor assembly 38" with respect to the electric coils 50". In the present configuration, forces and moments generated by the rotor blades 30" are transmitted through the rotor assembly 38", alignment bearing assembly 69", and stator assembly 36" to the stationary mast 26".

Figure 10:
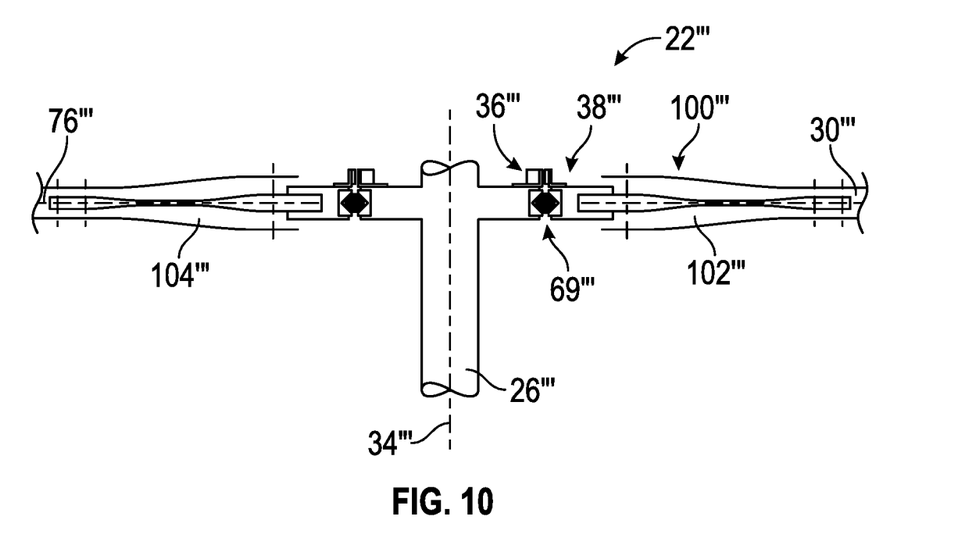
FIG. 10 is a cross section of a fourth embodiment of an electric propulsion system.
Figure 11:
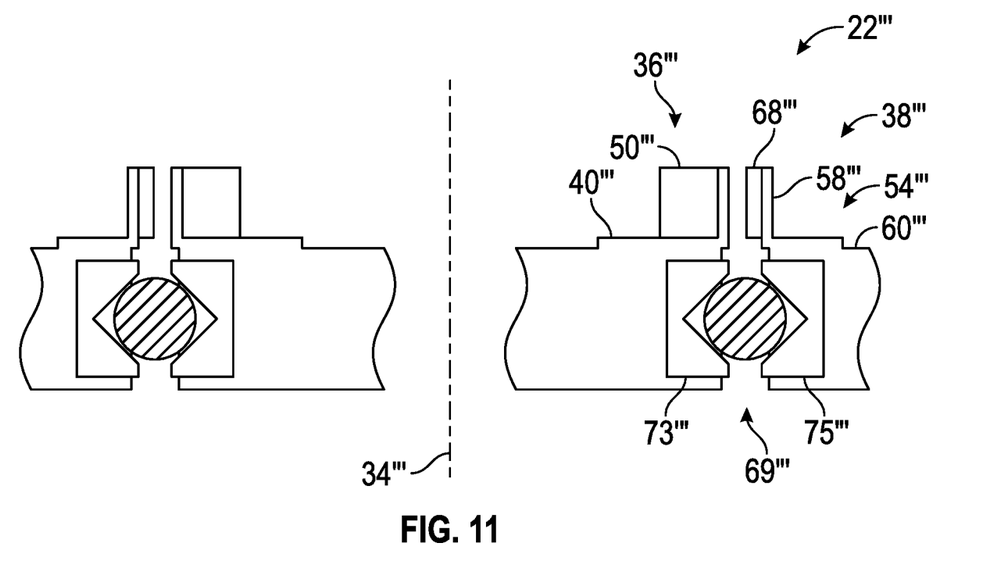
FIG. 11 is a partial enlarged cross section of the electric propulsion system of FIG. 10.

Referring to FIGS. 10 and 11, an additional embodiment of an electric propulsion system is illustrated wherein like elements to the previous embodiments have like identifying numerals, except with the addition of a triple prime symbol as a suffix.

Figure 12:
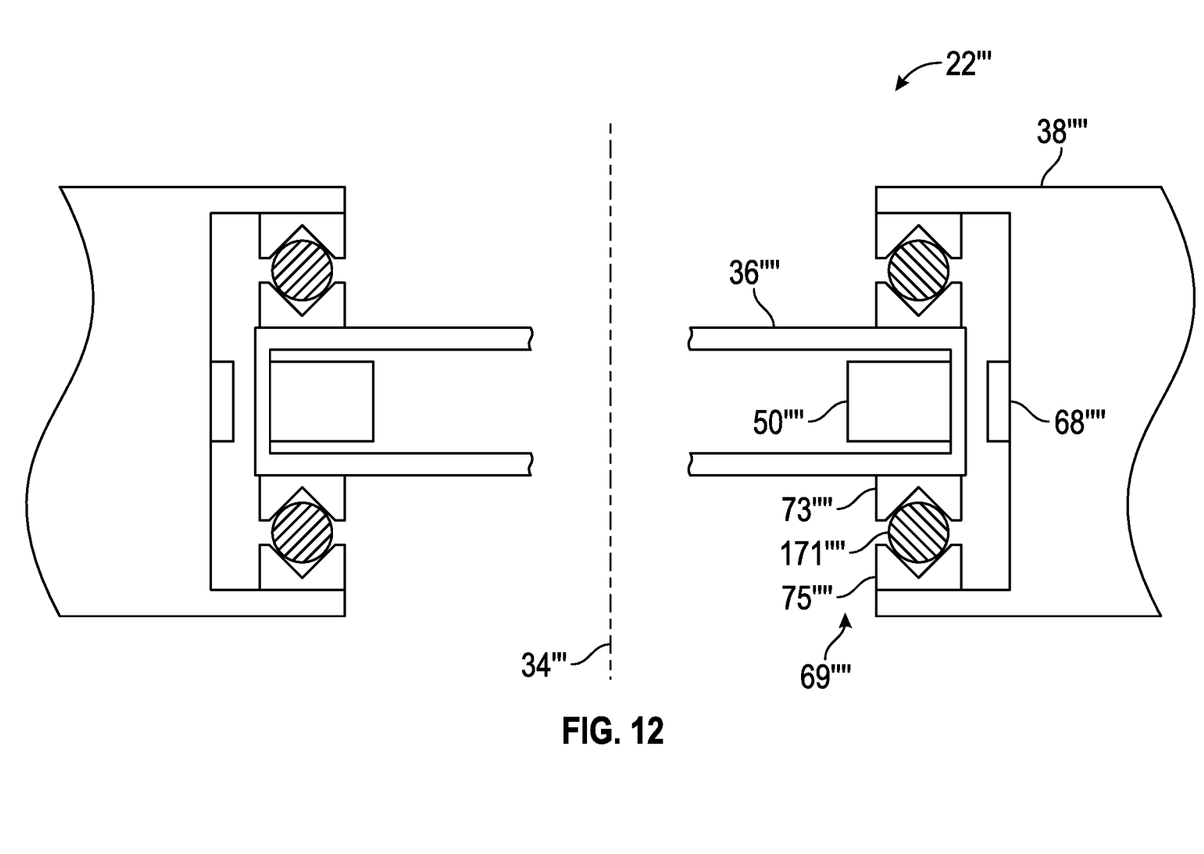
FIG. 12 is a partial enlarged cross section of a fifth embodiment of an electric propulsion system.

Referring to FIG. 12, an additional embodiment of an electric propulsion system is illustrated wherein like elements to the previous embodiments have like identifying numerals, except with the addition of a quadruple prime symbol as a suffix. In this embodiment, an electric propulsion system 22"" is most similar to the electric propulsion system illustrated in FIG. 8.

Benefits of the present disclosure may include but are not limited to a reduction in weight, fewer parts and lower costs relative to more traditional aircrafts. The present disclosure eliminates more traditional motor housing and mounting structures and replaces the rotating shaft with a structurally efficient static mast. Moreover, traditional gearboxes are eliminated. The rotor mounted magnet geometry of the present disclosure promotes an increase in torque with a reduction in RPM from more traditional designs, and the electrical power transfer does not require use of slip rings.

While the present disclosure is described with reference to exemplary embodiments, it will be understood by those skilled in the art that various changes may be made and equivalents may be substituted without departing from the spirit and scope of the present disclosure. In addition, various modifications may be applied to adapt the teachings of the present disclosure to particular situations, applications, and/or materials, without departing from the essential scope thereof. The present disclosure is thus not limited to the particular examples disclosed herein, but includes all embodiments falling within the scope of the appended claims.

What is claimed is:

1. A rotary wing aircraft comprising:
    an airframe;
    a mast fixedly engaged to the airframe and extending along a first axis;
    an electric motor including a stator assembly engaged to the mast, a rotor assembly disposed radially outward from the stator assembly and configured to rotate with respect to the stator assembly, and a bearing assembly including a first opposing race engaged to the stator assembly, a second opposing race positioned opposite to the first opposing race and engaged to the rotor assembly, and a plurality of bearings disposed between the first and second opposing races,
        wherein the stator assembly supports a plurality of electric coils, the rotor assembly supports a plurality of magnets, and the bearing assembly maintains an alignment between the plurality of electric coils and the plurality of magnets, maintains a tolerance between the plurality of electric coils and the plurality of magnets, and eliminates chafing between the stator assembly and the rotor assembly; and
a plurality of rotor blades projecting radially outward from the rotor assembly, wherein the stator assembly of the electric motor is vertically offset from the plurality of rotor blades.

2. The rotary wing aircraft set forth in claim 1 further comprising:
a teetering mechanism pivotally engaged to the rotor assembly, and wherein each one of the plurality of rotor blades are engaged to and project radially outward from the teetering mechanism.

3. The rotary wing aircraft set forth in claim 2, wherein the teetering mechanism includes a rocker arm pivotally engaged to the rotor housing and along a pivot axis that traverses the first axis.

4. The rotary wing aircraft set forth in claim 3, wherein the plurality of rotor blades project radially outward from and are supported by the rocker arm.

5. The rotary wing aircraft set forth in claim 3, wherein the rocker arm extends circumferentially continuously and is disposed radially outward from the rotor housing with respect to the first axis.

6. The rotary wing aircraft set forth in any of claim 3, wherein the rocker arm is oblong and extends longitudinally normal to the pivot axis.

7. The rotary wing aircraft of claim 1, wherein the electric motor is supported by a distal end portion of the mast.

8. The rotary wing aircraft set forth in claim 7, wherein the rotor assembly includes a rotor housing and at least one bearing race located radially between the rotor housing and the mast.

9. The rotary wing aircraft set forth in claim 1, wherein the plurality of magnets of the rotor assembly are arranged circumferentially about the mast and supported by the rotor housing.

10. The rotary wing aircraft set forth in claim 1, wherein the stator assembly includes a stator housing engaged to the mast, and the plurality of electric coils of the stator assembly are supported by the stator housing and arranged circumferentially about the mast.

11. The rotary wing aircraft set forth in claim 1 further comprising:
an articulating mechanism having a plurality of flex beams engaged to and projecting radially outward from the rotor assembly, and wherein each one of the plurality of rotor blades are engaged to and project radially outward from a respective one of the plurality of flex beams.

12. The rotary wing aircraft set forth in claim 1 further comprising: a heat exchanger configured to cool the stator assembly.

13. An electric propulsion system for an aircraft comprising:
a stator assembly configured about a rotational axis and including a plurality of electric coils;
a rotor assembly configured to rotate with respect to the stator assembly and including a plurality of magnets configured to react with an induced magnetic field generated by the electric coils when energized for rotation of the stator assembly;
a bearing assembly including a first opposing race engaged to the stator assembly, a second opposing race positioned opposite to the first opposing race and engaged to the rotor assembly, and a plurality of bearings disposed between the first and second opposing races, wherein the bearing assembly maintains an alignment between the plurality of electric coils and the plurality of magnets, maintains a tolerance between the plurality of electric coils and the plurality of magnets, and eliminates chafing between the stator assembly and the rotor assembly;
a teetering mechanism pivotally engaged to the rotor assembly about a pivot axis; and
a plurality of blades circumferentially spaced from one-another with respect to the rotational axis, and engaged to and projecting radially outward from the teetering mechanism.

14. The electric propulsion system set forth in claim 13, wherein the pivot axis is normal to and intersects the rotational axis.

15. The electric propulsion system set forth in claim 13, wherein the teetering mechanism includes a rocker arm pivotally engaged to the stator assembly about the pivot axis.

16. The electric propulsion system set forth in claim 15, wherein the rocker arm extends circumferentially continuously and is disposed radially outward from the rotor assembly.

17. The electric propulsion system set forth in claim 15, wherein the rocker arm is oblong and extends longitudinally along a feather axis disposed normal to the pivot axis.

18. The electric propulsion system set forth in claim 15, wherein diametrically opposed clearances are each defined by and located between the rocker arm and the rotor assembly.

19. The electric propulsion system set forth in claim 13, wherein the pivot axis traverses the rotational axis.

* * * * *